United States Patent [19]
Saito et al.

[11] Patent Number: 4,855,339
[45] Date of Patent: Aug. 8, 1989

[54] EPOXY RESIN COMPOSITION

[75] Inventors: Yasuhisa Saito, Higashiosaka; Hisao Takagishi, Kyoto; Hiroshi Nakamura, Ibaraki; Kohichi Okuno, Izumiotsu; Yutaka Shiomi, Minoo; Kunimasa Kamio, Suita, all of Japan

[73] Assignee: Sumitomo Chemical Company, Limited, Osaka, Japan

[21] Appl. No.: 298,858

[22] Filed: Jan. 19, 1989

Related U.S. Application Data

[63] Continuation of Ser. No. 854,313, Apr. 21, 1986, abandoned.

[30] Foreign Application Priority Data

Apr. 25, 1985 [JP] Japan ................................. 60-89779
Mar. 3, 1986 [JP] Japan ................................. 61-45665

[51] Int. Cl.$^4$ ...................... C08G 59/32; C08G 59/62
[52] U.S. Cl. .................................... 523/400; 523/435; 523/457; 523/468; 525/396; 525/423; 525/438; 525/463; 525/505; 525/507; 525/534; 528/99; 528/104
[58] Field of Search ............... 523/400, 435, 457, 468; 525/423, 463, 396, 438, 505, 507, 534; 528/99, 104

[56] References Cited

U.S. PATENT DOCUMENTS

| 3,530,087 | 9/1970 | Hayes et al. ............... 525/534 X |
| 3,725,341 | 4/1973 | Rogers et al. .............. 528/104 X |
| 3,738,862 | 6/1973 | Klarquist et al. ........... 528/104 X |
| 3,931,109 | 1/1976 | Martin ........................ 525/507 |
| 3,936,510 | 2/1976 | Harris et al. ................ 525/507 |
| 3,948,855 | 4/1976 | Perry . |
| 3,966,837 | 6/1976 | Riew et al. . |
| 4,107,116 | 8/1978 | Riew et al. . |
| 4,275,186 | 6/1981 | Kawakami et al. . |
| 4,322,456 | 3/1982 | Martin . |
| 4,448,948 | 5/1984 | Tsubaki et al. .............. 528/99 X |
| 4,528,346 | 7/1985 | Sugie et al. ................. 525/396 X |
| 4,609,691 | 9/1986 | Geist et al. . |

FOREIGN PATENT DOCUMENTS 0135811  4/1985  European Pat. Off. .
  66707  4/1973  Luxembourg .

Primary Examiner—Earl Nielsen
Attorney, Agent, or Firm—Stevens, Davis, Miller & Mosher

[57] ABSTRACT

An epoxy resin composition comprising (A) an epoxy resin having three or more epoxy groups per a molecule and (B) a reactive oligomer having in its molecule an aromatic residue connected thereto by —O— or —S— linkage and having at the terminal of the molecule a phenolic hydroxyl group.

18 Claims, No Drawings

EPOXY RESIN COMPOSITION

This application is a continuation of application Ser. No. 854,313, filed Apr. 21, 1986, now abandoned.

BACKGROUND OF THE INVENTION

1. FIELD OF THE INVENTION

This invention relates to an epoxy resin composition excellent in toughness, thermal resistance and low residual stress.

2. DESCRIPTION OF THE PRIOR ART

Epoxy resins in general have excellent characteristics in curing property, adhesive property, mechanical strength, and chemical resistance, and are used in a wide field of applications including molding, lamination, adhesives, and matrix resins for fiber reinforced composite materials. On the other hand, however, epoxy resins have a defect of being brittle. Thus, they have difficulties in toughness in that when they are cured with conventional amines, acid anhydrides, or phenol compounds, the resulting cured product shows poor impact strength and low elongation at break. This causes a serious problem particularly when they are used in structural materials of aeroplanes, motorcars and so forth.

On the other hand, in discrete semiconductors such as condensers, diodes, transistors, thyristors and Hall elements and integrated circuits including IC and LSI, as the sealing material for protecting the semiconductors mechanically and electrically from external environment, epoxy resins are mainly used at present. However, epoxy resins have a problem of internal stress being developed by the difference of the linear expansion coefficient of the resins from that of silicon chips or lead frames, or by strain produced in curing. The internal stress gives rise to flaws and cracks in the protective film for semiconductor elements, and further causes development of cracks in the semiconductors themselves. Further, the internal stress causes the distortion of lead frames, leading to poor insulation between frames.

The insufficient toughness of previous epoxy resins is caused by their excessively high density of crosslinking formed when the resins are cured with conventional amines, acid anhydrides and phenol compounds. One conceivable method of reducing the crosslinking density to some extent is to use either of the epoxy resin and the curing agent to be compounded in excess of the other. In this case, however, since the molecular chain is terminated with the epoxy resin or the curing agent positioned at the molecular terminal in the curing reaction, the resulting product is greatly deteriorated in such properties as mechanical strength, solvent resistance and water resistance, and hence cannot be used in practice.

The development of internal stress mentioned above is mainly affected by the linear expansion coefficient and the flexural modulus of the resin. Accordingly, it has been previously proposed to add an inorganic filler to the resin in order to decrease the linear expansion coefficient, and to add to a certain kind of flexibility-imparting agent to decrease the flexural modulus.

However, addition of too much an amount of inorganic fillers causes serious problems including increased flexural modulus, decreased moisture resistance, and deteriorated flowing properties.

Addition of flexibility-imparting agents results in insufficient crosslinking density, and hence causes the decrease of thermal resistance and moisture resistance, and further leads to the increase of the linear thermal expansion coefficient.

SUMMARY OF THE INVENTION

Under these circumstances, the present inventors have made extensive studies on the method of curing epoxy resins in order to find an epoxy resin composition which possesses excellent properties characteristic of epoxy resins including excellent curing property, adhesive property, mechanical strength, and chemical resistance, and at the same time can yield a cured product excellent in toughness and low residual stress, excellent also in such properties as solvent resistance and moisture resistance, and which is moreover excellent in processability. As a result it has been found that the abovementioned object can be achieved by using a specified reactive oligomer as a curing agent.

Thus, according to this invention, there is provided an epoxy resin composition comprising (A) an epoxy resin having three or more epoxy groups per a molecule and (B) a reactive oligomer having in its molecule an aromatic residue connected thereto by —O— or —S— linkage and having at the terminal of the molecule a phenolic hydroxyl group.

DETAILED DESCRIPTION OF THE INVENTION

The composition of this invention is characterized by extreme toughness of its cured product and further by low internal stress remaining therein as compared with previous epoxy resins. One reason for this is that since the reactive oligomer used in this invention has a higher molecular weight than that of previous epoxy-curing agent, it gives a cured product having larger distance between crosslinking points. Another reason is that since the reactive oligomer of this invention has a phenolic hydroxyl group, which reacts with an epoxy group in a molar ratio of 1/1, the molecule is more likely to grow in straight chain form than those having an amino group or acid anhydride group, giving a larger distance between crosslinking points to that extent.

A further reason for excellent toughness and excellent low residual stress development of the composition according to this invention is that the reactive oligomer has —O— or —S— linkage, which has a high degree of freedom of rotatory motion.

Examples of reactive oligomers used in this invention include polyaryl ethers, polycarbonates, polyarylate, and polyarylene sulfides, having respectively a terminal phenolic hydroxyl group. These reactive oligomers can be represented by the following general formula (I)

$$HO\text{---}Ar\text{(}X\text{---}R\text{---}X\text{---}Ar\text{)}_{\overline{n}}OH \qquad (I),$$

wherein X denotes a sulfur or oxygen atom; Ar denotes an aromatic divalent group; R denotes an aromatic divalent group when X is a sulfur atom, and denotes an aliphatic, group an aromatic group, an aliphatic divalent group,

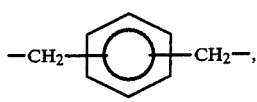
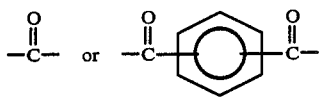
when X is an oxygen atom; and n denotes a positive number, usually 1 to 200.
As examples of aromatic divalent groups denoted by Ar in the general formula (I) shown above, there may be listed
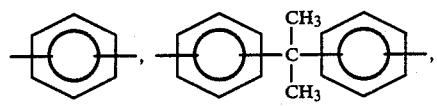
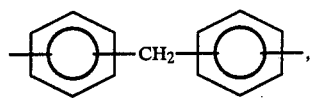
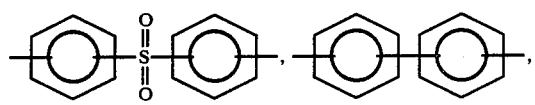
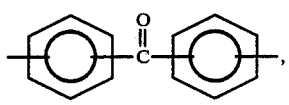
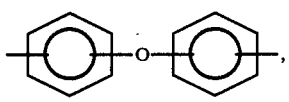
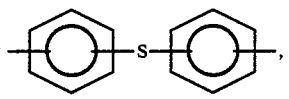
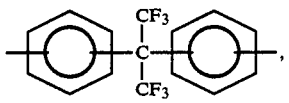
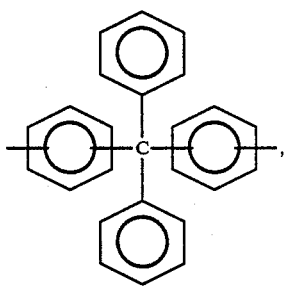
-continued
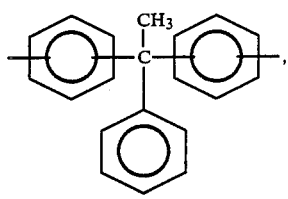
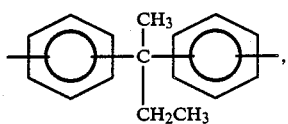
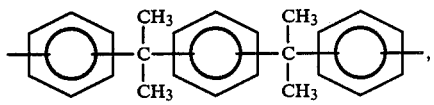
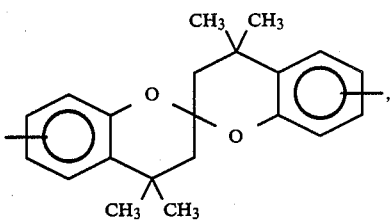
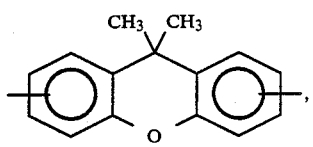
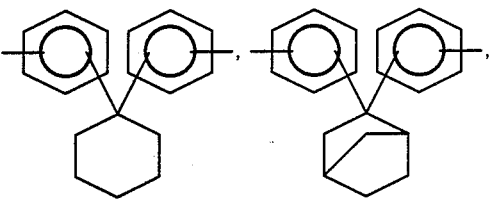
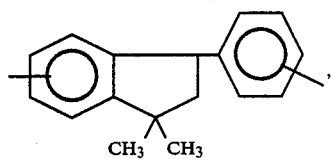
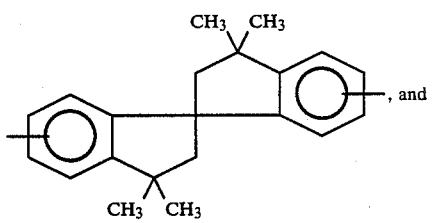

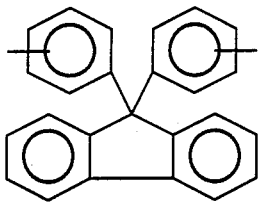

Each of the aromatic rings in the above formulas may be substituted by a lower alkyl group, lower alkoxy group, phenyl group, phenoxy group, or halogen atom.

When X in the general formula (I) shown above denotes a sulfur atom, the aromatic divalent groups denoted by R include, for example

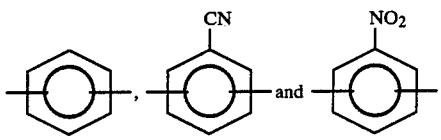

When X is an oxygen atom, examples of aliphatic divalent groups denoted by R include $-(CH_2)_{\overline{m}}$ (m being 1 to 10); those of aromatic divalent groups include

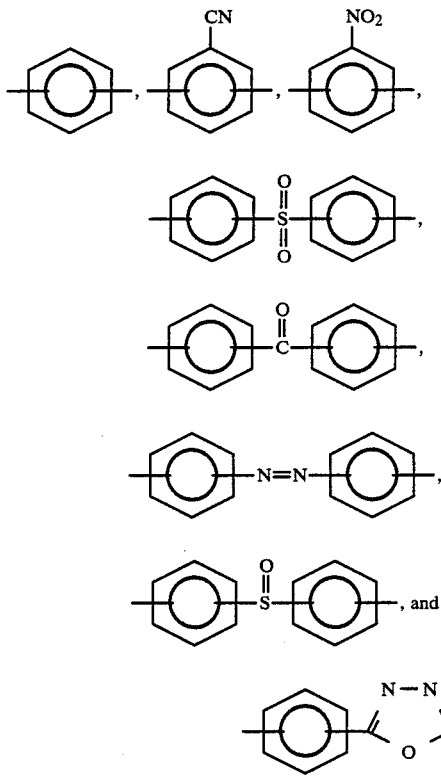

and those of heterocyclic divalent groups include

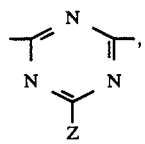

wherein Z denotes a hydrogen atoms, halogen atom, hydroxyl group, amino group, lower alkyl group, lower alkoxy group, mono- or dilower alkylamino group, phenyl group, mono- or diphenylamino group, phenoxy group, etc.). The aromatic ring in each of the divalent groups mentioned above may be substituted by a lower alkyl group, lower alkoxy group, phenyl group, phenoxy group, or halogen atom.

The reactive oligomer used in this invention has a number average molecular weight of preferably 500 to 20,000, more preferably 1,000 to 15,000, when used for applications where toughness is required; whereas for applications where low residual stress is required it is preferably 400 to 10,000, more preferably 400 to 5,000.

Specific examples of the reactive oligomers include polyaryl ethers represented by the following formulas (1) to (6):

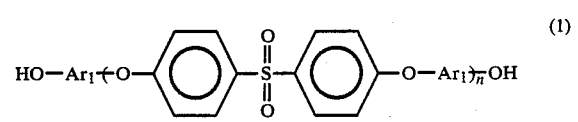

wherein n has the same meaning as defined above and $Ar_1$ denotes an aromatic divalent group such as

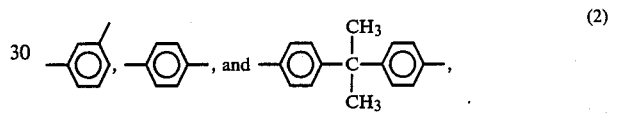

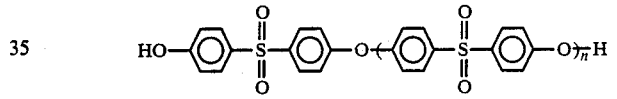

wherein n has the same meaning as defined above, $$HO-Ar_1(OCH_2O-Ar_1)_{\overline{n}}OH \quad (3)$$

wherein n and $Ar_1$ have each the same meaning as defined above,

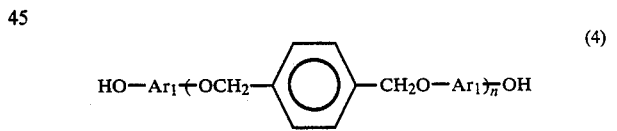

wherein n and $Ar_1$ have each the same meaning as defined above,

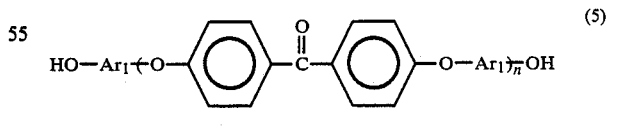

wherein n and $Ar_1$ have each the same meaning as defined above, and

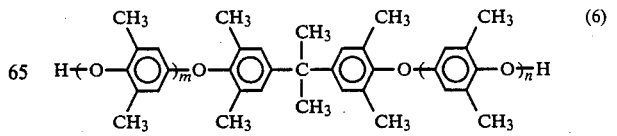

wherein n has the same meaning as defined above, and m denotes a positive number, usually 1 to 200;

polycarbonates represented by the following formula (7)

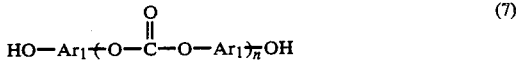

wherein n and Ar₁ have each the same meaning as defined above;

polyarylates represented by the following formula (8)

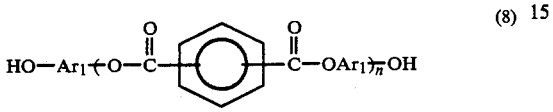

wherein n and Ar₁ have each the same meaning as defined above; and polyarylene sulfides represented by the following formulas (9) and (10):

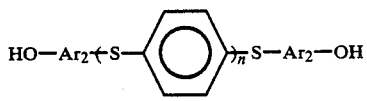

wherein n has the same meaning as defined above, and Ar₂ denotes an aromatic divalent group such as

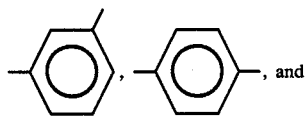

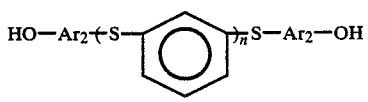

wherein n and Ar₂ have each the same meaning as defined above. Particularly preferred among these are oligomers represented by the above-mentioned formula (1) or (2).

These reactive oligomers can all be prepared by known methods. For example, the reactive oligomers represented by the formulas (1) to (5) shown above can be obtained by forming a dialkali metal salt of a bisphenol such as resorcinol, hydroquinone, bisphenol A or bisphenol S in a solvent such as dimethyl sulfoxide, dimethylformamide, dimethylacetamide and tetrahydrofuran, and then allowing the resulting salt to react with a dihalogen compound such as 4,4'-dichlorodiphenyl sulfone, dichloromethane, 4,4'-difluorobenzophenone or p-xylene dichloride, 2-phenoxy-4,6-dichloro-s-triazine, and 2-methoxy-4,6-dichloro-s-triazine. In order to make the molecular terminal a phenolic hydroxyl group, the molar ratio of the bisphenol to the dihalogen compound is selected such that the bisphenol is present in excess.

The reactive oligomers represented by the formula (6) shown above can be obtained by subjecting 2,6-xylenol and 2,2-bis(4-hydroxy-3,5-dimethylphenyl)propane to oxidative polymerization in the presence of oxygen by using a copper-pyridine complex catalyst in a solvent such as benzene, toluene and chloroform.

The reactive oligomer represented by the formula (7) shown above can be obtained by subjecting a bisphenol, such as resorcinol, hydroquinone or bisphenol A, and diphenyl carbonate to transesterification while removing phenol by distillation. Also in this case, the molar ratio of the bisphenol to diphenyl carbonate is selected so as to give an excess of bisphenol in order to make the molecular terminal a phenolic hydroxyl group.

The reactive oligomer represented by the formula (8) shown above can be obtained by reacting a bisphenol such as resorcinol, hydroquinone, or bisphenol A with a divalent acid chloride such as terephthalic acid chloride and isophthalic acid chloride in a solvent such as chlorinated biphenyl, benzophenone and nitrobenzene in the presence of a dehydrochlorinating agent. For the same purpose as above, the amount of bisphenol charged is selected in excess of that of acid chloride.

The reactive oligomer represented by the formulas (9) and (10) shown above can be obtained by reacting dichlorobenzene, chloronitrobenzene and sodium sulfide in a solvent such as N-methyl-2-pyrrolidone, hexamethylene phosphoramide, sulfolane, and dimethylacetamide, and then converting the terminal nitro group into a hydroxyl group through steps of reduction, diazotization, and hydrolysis. The molecular weight of the oligomer obtained can be varied by changing the molar ratio of dichlorobenzene to chloronitrobenzene.

The epoxy resin which is one of the essential components of this invention is one which has at least three epoxy groups in the molecule. Examples thereof include amine-type epoxy resins derived from p-aminophenol, m-aminophenol, 4-amino-m-cresol, 6-amino-m-cresol, 4,4'-diaminodiphenylmethane, 3,3'-diaminodiphenylmethane, 4,4'-diaminodiphenyl ether, 3,4'-diaminodiphenyl ether, 1,4-bis(4-aminophenoxy)benzene, 1,4-bis(3-aminophenoxy)benzene, 1,3-bis(4-aminophenoxy)benzene, 1,3-bis-(3-aminophenoxy)benzene, 2,2-bis(4-aminophenoxyphenyl)propane, p-phenylenediamine, m-phenylenediamine, 2,4-toluenediamine, 2,6-toluenediamine, p-xylylenediamine, m-xylylenediamine, 1,4-cyclohexanebis(methylamine), and 1,3-cyclohexanebis(methylamine); novolak-type epoxy resins derived from novolak resins which are the reaction products of a phenol such as phenol, o-cresol, m-cresol, and p-cresol with formaldehyde; glycidyl ether compounds derived from phenols having three or more hydroxyl groups such as phloroglucin, tris(4-hydroxyphenyl)methane, and 1,1,2,2-tetrakis(4-hydroxyphenyl)ethane; and further triglycidyl isocyanurate and 2,4,6-triglycidyl-S-triazine; or rubber- or urethane-modified products thereof. These epoxy resins are used each alone or in a combination of two or more thereof. However, they are not limited thereto. Particularly preferred epoxy resins among these are those of amine type in applications for composite materials where toughness is required, and those of novolak type for sealing applications where low residual stress is required.

It is possible in this invention to use an epoxy resin having two epoxy groups in the molecule along with the above-mentioned epoxy resin having three or more epoxy groups in the molecule. Examples of the former epoxy resin include diglycidyl ether compound derived from dihydric phenols such as bisphenol A, bisphenol F, hydroquinone or resorcinol, and halogenated bisphenols such as tetrabromobisphenol A; glycidyl ester compounds derived from aromatic carboxylic acids such as p-oxybenzoic acid, m-oxybenzoic acid, terephthalic acid and isophthalic acid; hydantoin-type epoxy resins derived from 5,5-dimethylhydantoin and the like; alicyclic epoxy resins such as 2,2-bis(3,4-epoxycyclohexyl)propane, 2,2-bis[4-(2,3-epoxypropyl)cyclohexyl]propane, vinylcyclohexene dioxide, and 3,4-epoxycyclohexylmethyl-3,4-epoxycyclohexane carboxylate; and further N,N-diglycidylaniline. These epoxy resins are used each alone or in combinations of two or more thereof.

Although the epoxy resin composition of this invention may be prepared by mixing the above-mentioned epoxy resin and the reactive oligomer in a conventional manner, a known curing agent may be incorporated thereto in addition to the epoxy resin and the reactive oligomer. Examples of known curing agents include dicyandiamide, tetramethylguanidine, aromatic amines, phenol novolak resins, cresol novolak resins, and various aliphatic and alicyclic amines; used each alone or in combinations of two or more thereof. Particularly preferred curing agents among these are aromatic amines in applications for composite materials where toughness is required, and phenol novolak resins or cresol novolak resins for sealing applications where low residual stress is required.

As examples of aromatic amines, mention may be made of 4,4'-diaminodiphenyl sulfone, 3,3'-diaminodiphenyl sulfone, 4,4'-diaminodiphenylmethane, 4,4'-diaminodiphenyl ether, m-phenylenediamine, p-phenylenediamine, 4,4'-methylenebis-orthochloroaniline, tetrachlorodiaminodiphenylmethane, 4,4'-diaminostilbene, 4,4'-diaminodiphenyl sulfide, m-xylylenediamine, p-xylylenediamine, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 3,3'-diaminodiphenylmethane, 3,4'-diaminodiphenyl ether, 2,4-toluenediamine, 2,6-toluenediamine, 5-amino-1-(4'-aminophenyl)-1,3,3-trimethylindane, and 6-amino-1-(4'-aminophenyl)-1,3,3-trimethylindane. They are used each alone or in combinations of two or more thereof.

In this invention, the reactive oligomer is used in an amount which will make the amount of hydroxyl groups present therein approximately equivalent to that of epoxy groups present in the epoxy resin. When a known curing agent is used, however, the oligomer is used in an amount which will make the sum of the amount of hydroxyl groups in the oligomer and that of functional groups present in the curing agent approximately equivalent to that of the epoxy groups.

When an epoxy resin, a reactive oligomer, and a known curing agent are used in combination, the amount of the reactive oligomer to be used to achieve the object of this invention is 20 to 80% by weight, preferably 20 to 70% by weight, relative to the total amount including that of the curing agent.

The epoxy resin composition of this invention may contain, as required, cure accelerators, thermoplastic resins of excellent toughness, etc.

As examples of the cure accelerators, there may be mentioned those known already including tertiary amines, phenol compounds, imidazoles, and Lewis acids.

As examples of the thermoplastic resins, there may be listed those represented by the following formulas:

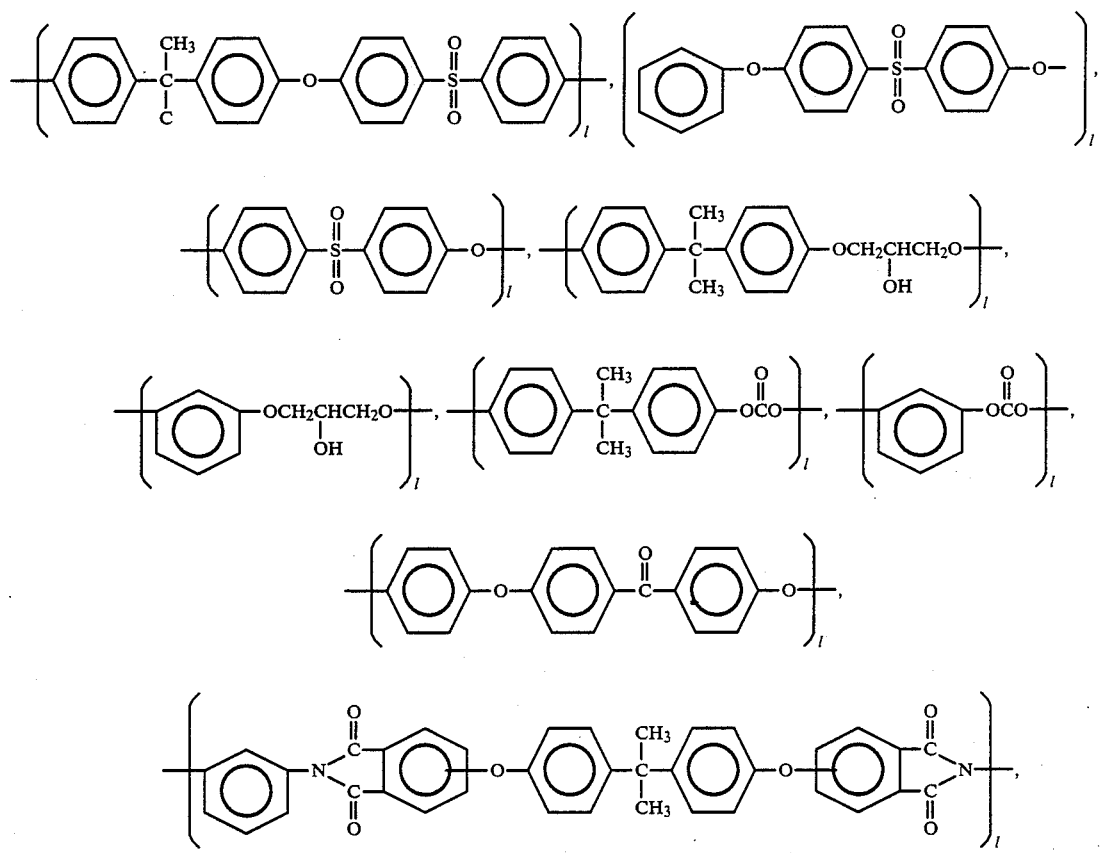

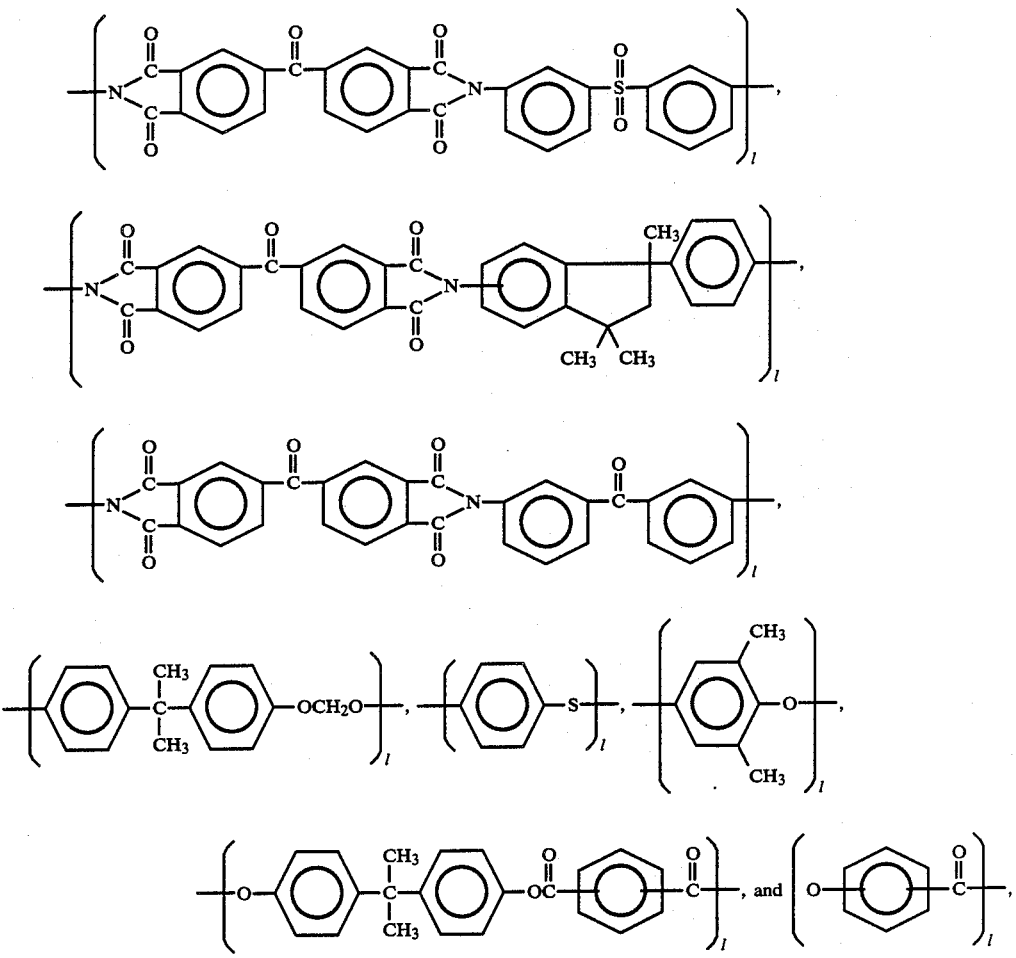

wherein l is a positive number. These polymers have preferably a molecular weight of 20,000 or more, more preferably 30,000 to 60,000.

The epoxy resin composition of this invention is used for molding, lamination, adhesive agents, matrix resins for fiber reinforced composite materials, and so forth to exert its characteristics including excellent low residual stress, toughness and impact strength. In these cases, if necessary, extenders, fillers, pigments, and the like may be used in combination therewith. Examples thereof include glass fibers, carbon fibers, alumina fibers, asbestos fibers, aramid fibers, silica, calcium carbonate, antimony trioxide, kaolin, titanium dioxide, zinc oxide, mica, barite, carbon black, polyethylene powder, polypropylene powder, aluminum powder, iron powder, and copper powder.

Particularly, a useful material as described below can be obtained when the epoxy resin composition of this invention is reinforced with a fiber of high strength and high modulus of elasticity such as a carbon fiber. Although carbon fiber-reinforced epoxy resins are gaining in importance as a structural material of light weight, high strength and high modulus of elasticity for aeroplanes and the like, they had a disadvantage in that they were poor in toughness and hence poor in impact resistance and further, cracks once formed therein readily expanded, leading to fatal fracture of the material. Further, although carbon fibers themselves have recently been markedly improved in elongation at break and strength, there has been revealed an unfavorable fact that the composite materials obtained by reinforcing epoxy resins with such carbon fibers are not improved in elongation at break and hence in strength. Although attempts were made to solve the problem by using a more flexible epoxy resin composition, it was unsuccessful because of a newly occurred problem of inferior rigidity of the resulting composite material at high temperatures. The present inventors have found that the use of the epoxy resin composition of this invention overcomes all these difficulties. Thus, it has been found that the composite material obtained by reinforcing the epoxy resin composition of this invention with carbon fiber has a high impact strength and requires a large amount of energy in fracture propagation, and that the composite material has a very high tensile strength when a carbon fiber of particularly large elongation at break is used therein.

Although any suitable carbon fiber may be used in the composition of this invention, particularly effective are those having a tensile strength of 150 kgf/mm$^2$ or more and a modulus of elasticity of 15,000 kgf/mm$^2$ or more. The volume fraction of the fiber is the composite material is most preferably 20 to 80%. Further, besides carbon fibers, there may be also used alumina fibers, silicon carbide fibers, aramid fibers and the like which have mechanical strength similar to that of carbon fibers.

When the epoxy resin composition is used for sealing, it can be incorporated with silica, calcium carbonate, antimony oxide, kaolin, titanium dioxide, olyethylene powder, polypropylene powder, and the like as a filler to attain an excellent low residual stress without the deterioration of thermal resistance and moisture resistance.

This invention is further described in detail below with reference to Examples and Comparative Examples, but it is not limited thereto. In these examples, all "parts" are "parts by weight" unless specified otherwise.

SYNTHESIS EXAMPLE 1

Into a flask equipped with a stirrer, a thermometer and a condensation-liquid separation apparatus were placed 66.1 parts or resorcinol, 402 parts of dimethyl sulfoxide, 613 parts of chlorobenzene and 100.0 parts of 48% sodium hydroxide. The resulting mixture was brought to 115° C. while thoroughly replacing the inner atmosphere of the flask with nitrogen. Azeotropic dehydration was begun at 115° C. and continued until the temperature reached 140° C. After completion of the azeotropic dehydration, the temperature was succeedingly elevated up to 160° C. to distill chlorobenzene off.

After chlorobenzene was distilled off, the reaction mixture was at once cooled down to 50° C. or below. At this temperature, 160.8 parts of 4,4'-dichlorodiphenyl sulfone was added thereto, and the whole was brought up to a temperature of 160° C. and allowed to react at this temperature for 3 hours. After completion of the polymerization reaction, the reaction mixture was cooled down to 100° C., mixed with hydrochloric acid to neutralize excess sodium hydroxide, and poured into water to precipitate resin, which was then taken out.

The resorcinol-type polysulfone thus obtained was found to have a number average molecular weight of 4,700 as determined by the analysis of terminal hydroxyl groups.

SYNTHESIS EXAMPLE 2

The procedures in Synthesis Example 1 were repeated except that 102.7 parts of bisphenol A was used in place of resorcinol and the amount of 4,4'-dichlorodiphenyl sufone used was changed to 100.5 parts. The bisphenoltype polysulfone obtained had a molecular weight of 1,800.

SYNTHESIS EXAMPLE 3

Into a flask equipped with a stirrer and a thermometer were placed 88.1 parts of resorcinol, 163.2 parts of diphenyl carbonate, and 0.0098 part of 4-(N,N-dimethylamino)pyridine, and the mixture was kept molten at 100° C. for 1 hour. Then, evacuation of the flask was begun. The degree of vacuum was gradually increased while the temperature was also gradually elevated. Ultimately the distilling off of phenol was completed at a degree of vacuum of 2 mmHg and a temperature of 300° C. Thus, a resorcinol-type polycarbonate was obtained. It had a molecular weight of 2,900 as determined by the analysis of terminal hydroxyl groups.

SYNTHESIS EXAMPLE 4

Into a flask equipped with a stirrer, a thermometer, and a condensation-liquid separation apparatus were placed 91.3 parts of bisphenol A, 240 parts of dimethyl sulfoxide, 72 parts of toluene, and 66.7 parts of 48% sodium hydroxide. The resulting mixture was brought to 100° C. while thoroughly replacing the inner atmosphere of the flask with nitrogen. Azeotropic dehydration was begun at 100° C. and continued until the temperature reached 140° C. Then, the reaction mixture was cooled down to 85° C. At this temperature, a liquid mixture of 32.6 parts of methylene chloride and 30 parts of dimethyl sulfoxide was added dropwise to said reaction mixture over a period of 2 hours. After completion of the dropwise addition the resulting mixture was kept at 100° C. for 1 hour. After completion of the reaction, the excess of sodium hydroxide was neutralized with hydrochloric acid, and the resulting product was mixed with isopropanol to precipitate resin, which was then taken out. The bisphenol-type polyformal thus obtained had a molecular weight of 6,000 as determined by the analysis of terminal hydroxyl groups.

EXAMPLES 1, 2, 3 AND 4, AND COMPARATIVE EXAMPLE 1

Each of the mixtures having a composition shown in Table 1 was thoroughly milled with a roll at 100° C., then cooled and pulverized. The resulting product was press-molded for 30 minutes under conditions of 150° C. and 100 kg/cm$^2$, and then post-cured at 180° C. for 6 hours to prepare samples for evaluation. The physical properties of the cured products were also summarized in the Table.

EXAMPLE 5 AND COMPARATIVE EXAMPLE 2

A unidirectionally reinforced composite material was prepared which used the resin composition of Example 1 and Comparative Example 1 mentioned above, respectively, as matrix and contained 60% by volume of a carbon fiber having a tensile strength of 420 kgf/mm$^2$, a modulus of elasticity of 24,000 kgf/mm$^2$ and an elongation at break of 1.8% to serve as Example 5 and Comparative Example 2, respectively. The physical properties obtained with these examples are summarized in Table 2.

TABLE 1

| | Example No. | Example 1 | Example 2 | Example 3 | Example 4 | Comparative Example 1 |
|---|---|---|---|---|---|---|
| Composition (parts) | Sumiepoxy ELM-434 | 118 | — | — | 35.4 | 118 |
| | Sumiepoxy ELM-120 | — | 72.0 | 120 | — | — |
| | Sumiepoxy ELA-128 | — | 74.8 | — | 131 | — |
| | Synthesis Example 1 | 115 | — | — | — | — |
| | Synthesis Example 2 | — | 206 | — | — | — |
| | Synthesis Example 3 | — | — | 132 | — | — |
| | Synthesis Example 4 | — | — | — | 136 | — |
| | 4,4'-Diaminodiphenyl sulfone | 53 | 41 | 52 | 54 | 53 |
| | BF$_3$·monoethylamine | 0.5 | 0.5 | 0.5 | 0.5 | 0.5 |
| | $G_{IC}$ (KJ/m$^2$) | 0.8 | 1.5 | 1.2 | 2.0 | 0.08 |
| | Tensile strength | 9.9 | 10.4 | 10.9 | 12.1 | 5.5 |

TABLE 1-continued

|  | Example No. | Example 1 | Example 2 | Example 3 | Example 4 | Comparative Example 1 |
|---|---|---|---|---|---|---|
| Physical properties | (kg/mm$^2$) | | | | | |
| | Tensile modulus of elasticity (kg/mm$^2$) | 345 | 302 | 363 | 315 | 390 |
| | Tensile elongation (%) | 3.0 | 3.6 | 3.1 | 4.2 | 1.5 |

Note:
(1) Sumiepoxy ELM-434, ELM-120 and ELA-128 are all epoxy resins manufactured by Sumitomo Chemical Co., Ltd.
(2) $G_{IC}$: Fracture energy release
(3) Method of determination
$G_{IC}$: ASTM E-399-78
Tensile properties: JIS K6911-79-5.18

TABLE 2

| Example No. | | Example 5 | Comparative Example 2 |
|---|---|---|---|
| Tensile strength | Kg/mm$^2$ | 238 | 202 |
| Tensile modulus of elasticity | " | 13300 | 13500 |
| Tensile elongation | % | 1.8 | 1.5 |
| Bending strength | Kg/mm$^2$ | 218 | 201 |
| Flexural modulus | " | 13200 | 13300 |
| $G_{IC}$*(1) | KJ/m$^2$ | 0.92 | 0.15 |
| Izod impact strength | " | 210 | 155 |

Note:
*(1)$G_{IC}$: Fracture energy release
Method of determination:
$G_{IC}$: NASA RP1092-83
Tensile properties: ASTM D3039-76
Flexural properties: ASTM D790-80
Izod impact strength: JIS K-6911-79-5.21

SYNTHESIS EXAMPLE 5

The procedures of Synthesis Example 1 were repeated except that the amount of resorcinol used was changed to 93.6 parts, that of dimethyl sulfoxide to 434 parts, that of chlorobenzene to 669 parts, that of 48% sodium hydroxide to 137.9 parts, and that of 4,4'-dichlorodiphenyl sulfone to 170.9 parts. The resorcinol-type polysulfone obtained had a molecular weight of 1040.

SYNTHESIS EXAMPLE 6

The procedures of Synthesis Example 5 were repeated except that 148.4 parts of bisphenol A was used in place of resorcinol and the amount of 4,4'-dichlorodiphenyl sulfone used was changed to 118.6 parts. The bisphenol-type polysulfone obtained had a molecular weight of 1040.

SYNTHESIS EXAMPLE 7

The procedures of Synthesis Example 6 were repeated except that the amounts of bisphenol A and 4,4'-dichlorodiphenyl sulfone were changed to 159.6 parts and 100.5 parts, respectively. The bisphenol-type polysulfone obtained had a molecular weight of 680.

EXAMPLES 6 TO 9, AND COMPARATIVE EXAMPLE 3

Orthocresol novolak epoxy (mfd. by Sumitomo Chemical Co., Ltd., epoxy equivalent: 197), phenol novolak (OH equivalent: 110), reactive oligomers obtained in Synthesis Examples 5 to 7, DBU (mfd. by Sun Abott Co.), silica (Hi-Silex, mfd. by Hayashi Kasei), silane coupling agent (SH6040, mfd. by Toray Silicone Co.) and carnauba wax were mixed in a composition shown in Table 3 and roll-milled thoroughly at 110° C., then cooled and pulverized. The resulting product was transfer-molded for 5 minutes at 175° C. and 70 kg/cm$^2$, and then postcured at 180° C. for 5 hours to prepare a sample for evaluation. The molded product was subjected to various tests, and the results are shown in Table 3. In Table 3, the bending test was conducted according to JIS K-6911; the glass transition point and linear expansion coefficient were determined according to TMA method. The moisture absorption is the value obtained after allowing the speciment to stand at 121° C. and 100% R.H. for 100 hours.

From these results of determinations, it has been confirmed that the products obtained in Examples 6 to 9 are of excellently low residual stress and also excellent in thermal resistance and moisture resistance as compared that in Comparative Example 3.

TABLE 3

| | Example No. | Example 6 | Example 7 | Example 8 | Example 9 | Comparative Example 3 |
|---|---|---|---|---|---|---|
| Composition (parts) | Orthocresol novolak epoxy (ESCN-195X2, mfd. by Sumitomo Chemical Co., epoxy equivalent 197) | 100 | 100 | 100 | 100 | 100 |
| | Phenol novolak (OH equivalent 110) | 25.1 | 29.6 | 39.8 | 33.4 | 56 |
| | Synthesis Example 5 | 127.1 | — | — | — | — |
| | Synthesis Example 6 | — | 131.6 | — | — | — |
| | Synthesis Example 7 | — | — | 40 | — | — |
| | Synthesis Example 8 | — | — | — | 60 | — |
| | DBU (mfd. by Sun Abott Co.) | 2 | 2 | 2 | 2 | 2 |
| | Carnauba wax | 1 | 1 | 1 | 1 | 1 |
| | Silane coupling agent (SH-6040, mfd. by Toray Silicone Co.) | 3.3 | 3.3 | 2.3 | 2.5 | 2 |
| | Silica (Hi-Silex, | | | | | |

TABLE 3-continued

| Example No. | | Example 6 | Example 7 | Example 8 | Example 9 | Comparative Example 3 |
|---|---|---|---|---|---|---|
| Physical properties | mfd. by Hayashi Kasei) | 596 | 616 | 427 | 463 | 370 |
| | Flexural modulus (kg/mm$^2$) | 1100 | 1050 | 1070 | 980 | 1450 |
| | Linear expansion coefficient (×10$^{-5}$°C.$^{-1}$) | 3.2 | 3.2 | 3.0 | 2.9 | 3.5 |
| | Glass transition point (°C.) | 163 | 163 | 165 | 168 | 162 |
| | Moisture absorption* (%) | 0.73 | 0.71 | 0.71 | 0.70 | 0.90 |

Note:
*Determined after 100 hours at 121° C. and 100% R.H.

What is claimed is:

1. An epoxy resin composition comprising (A) an epoxy resin having three or more epoxy groups per molecule and (B) a reactive oligomer having an average molecular weight of about 400 to 5,000 selected from the oligomers represented by the following formulas,

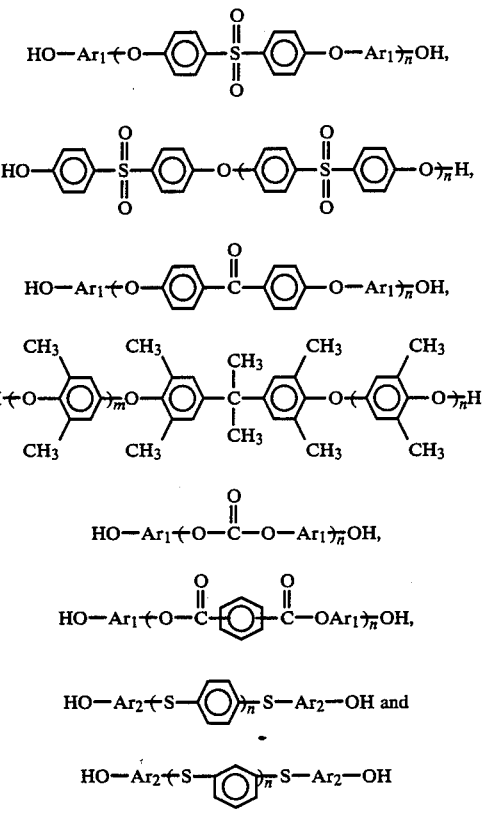

wherein n denotes a positive number, and Ar$_1$, and Ar$_2$ each denotes an aromatic divalent group.

2. An epoxy resin composition according to claim 1, which contains (C) an epoxy-curing agent.

3. An epoxy resin composition according to claim 1, wherein the amount of the reactive oligomer is 20 to 80% by weight relative to the total amount of the epoxy resin and the reactive oligomer.

4. An epoxy resin composition according to claim 1, wherein the amount of the reactive oligomer is 20 to 80% by weight relative to the total amount of the epoxy resin, the reactive oligomer and the epoxy-curing agent.

5. An epoxy resin composition according to claim 3, wherein the epoxy resin is an glycidyl amine epoxy resin.

6. An epoxy resin composition according to claim 4, wherein the epoxy resin is an glycidyl amine epoxy resin.

7. An epoxy resin composition according to claim 4, wherein the epoxy-curing agent is an aromatic amine.

8. An epoxy resin composition according to claim 6, wherein the epoxy-curing agent is an aromatic amine.

9. An epoxy resin composition according to claim 3, wherein the epoxy resin is an epoxidized novolak epoxy resin.

10. An epoxy resin composition according to claim 4, wherein the epoxy resin is an epoxidized novolak epoxy resin.

11. An epoxy resin composition according to claim 10, wherein the epoxy-curin agent is a phenol novolak resin or a cresol novolak resin.

12. An epoxy resin composition according to claim 3, wherein the reactive oligomer is one having —SO$_2$— linkage in the molecule.

13. An epoxy resin composition according to claim 5, wherein the reactive oligomer is one having —SO$_2$— linkage in the molecule.

14. An epoxy resin composition according to claim 8, wherein the reactive oligomer is one having —SO$_2$— linkage in the molecule.

15. An epoxy resin composition according to claim 9, wherein the reactive oligomer is one having —SO$_2$— linkage in the molecule.

16. An epoxy resin composition according to claim 11, wherein the reactive oligomer is one having —SO$_2$— linkage in the molecule.

17. A semiconductor sealed by the epoxy resin composition according to claim 1.

18. A composition material obtained by reinforcing the epoxy resin composition according to claim 1, with at least one fiber selected from the group consisting of carbon fibers, alumina fibers, silicon carbide fibers and aramide fibers.

* * * * *